United States Patent Office 3,784,567
Patented Jan. 8, 1974

3,784,567
METHOD FOR PRODUCING DERIVATIVES OF 6-HYDROXY CAPROIC ACID
Arsene Isard, St. Genis Laval, and Francis Weiss, Pierre-Benite, France, assignors to Ugine Kuhlmann, Paris, France
No Drawing. Filed July 3, 1968, Ser. No. 742,158
Int. Cl. C07c 67/00; C07d 9/00
U.S. Cl. 260—488 F                                   10 Claims

ABSTRACT OF THE DISCLOSURE

ε-Caprolactone and ε-formyloxycaproic acid are produced by contacting the peroxides of cyclohexanone, particularly the dimer or the trimer thereof, in a non-polar solvent with a solution of concentrated formic acid having therein a small amount of a mineral acid, such as sulfuric acid, hydrochloric acid or phosphoric acid, or a strong organic acid such as methanesulfonic acid, ethanesulfonic acid or p-toluenesulfonic acid, at a temperature in the range between 0° and 40° C. and for a period sufficient for the transformation of the peroxides into the derivatives of 6-hydroxy caproic acids.

BACKGROUND OF THE INVENTION

(I) Field of the invention

This invention relates to a method for producing derivatives of 6-hydroxy caproic acids from peroxides of cyclohexanone.

(II) Description of the prior art

French Pat. No. 1,407,154 of June 16, 1964 discloses that various peroxides of cyclohexanone react with concentrated formic acid, in the absence of any mineral acidity to produce ε-caprolactone and ε-formyloxycaproic acid. The reactivities of the peroxides of cyclohexanone depend on their structure. For cyclic peroxides of the following formulae, which are a dimer and a trimer respectively,

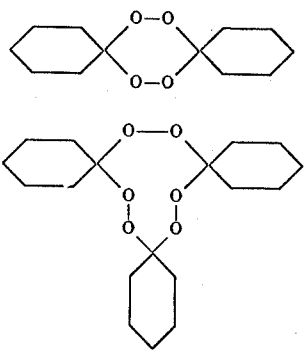

they are relatively inert to the action of the formic acid. A relatively high temperature range, 60–100° C., must be used in order to carry out the transformation.

It is also known that cyclic peroxides of cyclohexanone have relatively low solubilities in formic acid medium and can be extracted therefrom with non-polar solvents immiscible therewith. The extractability of the cyclic peroxides from formic medium, in fact, has been utilized advantageously in the method for producing ε-caprolactone and ε-formyloxycaproic acid by oxidizing cyclohexanone with a mixture of formic acid and hydrogen peroxide as disclosed in Weiss United States application Ser. No. 614,014 filed Feb. 6, 1967, now U.S. Pat. 3,428,656.

The combined properties of relative inertness and high extractability with non-polar solvents of cyclic peroxides of cyclohexanone in concentrated formic acid hinder prior attempts to convert the cyclic peroxides to more valuable commercial products, ε-caprolactone and ε-formyloxycaproic acid. It has been found that contacting cyclic peroxides of cyclohexanone in non-polar solvents with formic acid even at the boiling temperature of the system causes only a very slow transformation of the cyclic peroxides due to the low solubilities of the peroxides in formic acid and hence the concentration of the peroxide therein is very low. To overcome this deficiency, it has been necessary to evaporate the non-polar solvent before or during the treatment with formic acid to improve the dissolution of the cyclic peroxide into the formic acid phase. The necessity of evaporating the non-polar solvent at relatively high temperature has increased the cost of the process with added risks of explosion.

SUMMARY OF THE INVENTION

We have discovered that the transformation of cyclic peroxides of cyclohexanone, particularly the dimer and the trimer thereof, into ε-caprolactone and ε-formyloxycaproic acid can be substantially improved and at a substantially lower temperature and shorter reaction time when a small amount of a mineral acid or a strong organic acid is added to the formic acid even in a heterogeneous reaction medium wherein the cyclic peroxides have higher solubility in the non-polar solvent phase. Broadly stated, the method of this invention for producing the derivatives of 6-hydroxy caproic acid comprises reacting at a temperature in the range between 0° and 40° C. a solution of concentrated formic acid and a small amount of a mineral acid or a heavy organic acid with at least one peroxide of cyclohexanone dissolved in an inert non-polar solvent immiscible with the solution of formic acid for a period sufficient for the transformation of the peroxide at the reaction temperature to ε-caprolactone and ε-formyloxycaproic acid and thereafter recovering the products therefrom.

The concentrated formic acid used for preparing the solution should contain less than 25% by weight of water and the amount of mineral or strong organic acid therein advantageously should be in the range between 0.25% to about 5% by weight based on the formic acid in the solution.

DESCRIPTION OF THE PREFERRED EMBODIMENTS

The peroxides of cyclohexanone which are particularly suitable for transformation into ε-caprolactone and ε-formyloxycaproic acid using the method of this invention are the dimer and the trimer which have the following structural formulae respectively:

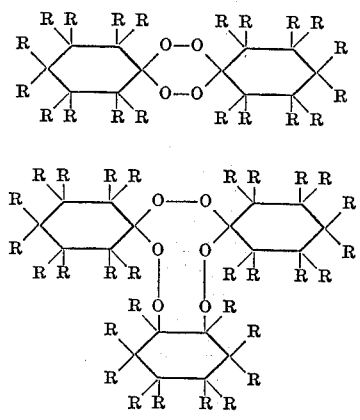

wherein each R may be a hydrogen atom, an alkyl or a cyclic alkyl such as for example methyl, ethyl, propyl, isopropyl, butyl, isobutyl, t-butyl, octyl, dodecyl and cyclohexyl. Preferably, the hydrocarbon rings are substituted with not more than four alkyl or cyclic alkyl groups and the total substituents have less than 12 carbon atoms.

The cyclic peroxides of cyclohexanone may be prepared by any known methods. Usually, they are the byproducts of oxidation reactions of cyclohexanone for the preparation of derivatives of 6-hydroxy caproic acids.

In carrying out the method of this invention, one or a mixture of cyclic peroxides is preferably dissolved in an inert non-polar solvent which is substantially immiscible with the formic acid solution containing a small amount of mineral acid or heavy organic acid. A number of non-polar solvents can be used for this purpose. Among them we found saturated hydrocarbons having about 5 to 12 carbon atoms such as linear or branched paraffins; cycloalkanes having 5 to 12 carbon atoms such as cyclopentane, cyclohexane, cyclododecane; aromatic hydrocarbons having 6 to 8 carbon atoms such as benzene, toluene, xylene and halogenated lower alkanes such as carbon tetrachloride to be eminently suitable.

Generally, the concentration of the peroxide of cyclohexanone in the non-polar solvent is not critical. A wide range of concentrations have been found to be operable. The preferred range is between 2% and 25% by weight based on the solvent.

The method of this invention is particularly advantageous for treating the peroxides of cyclohexanone extracted from the hydrogen peroxide and formic acid reaction medium used for oxidizing the cyclohexanone according to the aforesaid Weiss United States patent application. The peroxides of cyclohexanone are the byproducts of parasitic reactions which are removed from the reaction medium by extraction using inert non-polar solvent immiscible with formic acid. Hence, the resultant peroxides in the non-polar solvent may be used directly to react with the formic acid solution containing the small amount of mineral or heavy organic acid. The crude peroxides thus recovered may contain a small amount of impurities such as cyclohexanone, hydrogen peroxide, caprolactone and formic acid which may be used as such to react with formic acid solution without lowering the efficiency of the reaction.

The formic acid used for preparing the acidic solution for reacting with the peroxides must be concentrated and should contain less than about 25% of water by weight. We found the optimal results are obtained using highly concentrated formic acid containing less than about 2% of water. In preparing the acidic solution a mineral or a strong organic acid miscible with the formic acid is added to the formic acid in an amount equivalent to about 0.25% to about 5% by weight based on the formic acid. The preferred mineral acids are sulfuric, phosphoric, and hydrochloric acids. The suitable strong organic acids are methanesulfonic, ethanesulfonic and p-toluenesulfonic acids.

In carrying out the reaction at least 2 mols of formic acid per gram-atom of peroxidic oxygen must be used. However, there does not appear to be any upper limit as to the amount of formic acid that may be used to transform the peroxide. Generally, if the formic acid solution after the reaction is to be further treated for the recovery of the products, it is advantageous not to use a large amount of formic acid solution exceeding about 10 mols of formic acid per gram-atom of peroxidic oxygen to avoid an excessively diluted product solution. In certain instances, the ratio of formic acid to peroxidic oxygen may exceed the aforesaid value by a large amount. A ratio up to about 100 mols of formic acid per gram-atom of peroxidic oxygen may be used in the operation which requires the re-use of the resultant formic acid phase without immediate separation or to mix with another mixture of the same nature prior to the separation operation. In such case, the acidity of the solution may best be neutralized prior to the subsequent separation treatment.

The reaction of the peroxide of cyclohexanone and the formic acidic solution may be carried out batchwise or continuously. In a batch operation the reaction may be conveniently conducted in a reaction vessel equipped with an efficient mixer such as a stirrer or a circulating pump and with a cooling device to remove the heat generated from the reaction and for maintaining the reaction in the range between 0° and 40° C. After the reactants are mixed for a period sufficient to allow substantially all of the peroxides to transform into the derivatives of 6-hydroxy caproic acid, which usually is less than about three hours depending on the temperature and concentration of the reactants, the two immiscible phases are separated. $\epsilon$-Caprolactone and $\epsilon$-formyloxycaproic acid transfer to the formic acid solution and may be recovered therefrom in a known manner such as by solvent extraction.

For a continuous operation, a series of cascade reactors each equipped with mixing and cooling devices may be used in combination with a decanter. The two fresh solutions are introduced into the first of the series of reactors and after a predetermined resident time therein flow into a second reactor by gravity and so on. Finally, the mixture from the last reactor flows into the decanter wherein the two immiscible phases are separated and the product may be recovered from the formic acid layer.

The operation may be conducted in a counter-current flow arrangement in a series of reactors and decanters such as a series of mixers and settlers or in an extraction column with Raschig rings or other fillers or plates. The solution of peroxides in the non-polar solvent is introduced at the bottom of the column when it is lighter than the formic acid phase and the formic acid solution is introduced from the top. The exhaust solvent, in such operation, is recovered from the top and the formic acid phase containing the products are recovered from the bottom. Similarly, a reversed arrangement, namely, introducing the peroxide solution from the top and the formic acid solution from the bottom, if the formic acid solution is lighter than the peroxide solution can also be utilized.

It is interesting to note the present invention carries out the transformation of peroxides of cyclohexanone to $\epsilon$-caprolactone and $\epsilon$-formyloxycaproic acid in a manner similar to a liquid-liquid extraction operation wherein the transformed peroxides are extracted by the formic acid solution having therein a mineral or a heavy organic acid. Thus, the method of this invention allows subsequent recovery of the non-polar solvent by a simple decantation operation in a sufficient pure form for reuse. Accordingly, the formic acid solution with a small amount of mineral or heavy organic acid may be considered as a reactive extraction solvent.

Further to illustrate this invention specific examples are described hereinbelow.

EXAMPLE 1

In this example 72 grams of a cyclohexane solution containing 15.8% by weight of peroxides of the cyclohexanone 2% by weight of cyclohexanone and 0.3% of caprolactone wherein the peroxides were essentially the cyclic trimer (about 85% by weight of the total peroxides) and cyclic dimer (about 15%) was used. This solution, equal to 0.1 gram-atom peroxidic oxygen was brought into contact at 20° C. with 46 g. of 99% formic acid (1 mol) in which 0.5 g. of pure sulfuric acid was dissolved in a flask equipped with a stirrer and externally cooled by water. After two hours and a half 94% of the peroxides were converted and the formic acid phase contained besides traces of non-converted peroxides, 2.25 g. of $\epsilon$-caprolactone (0.020 mol) and 9.9 g. of $\epsilon$-formyloxycaproic acid (0.062 mol). The yield in derivatives of 6-hydroxycaproic acid amounted to about 85% based on the converted peroxides, after deduction of the caprolactone already present in the initial solution.

EXAMPLE 2

In this example the same solution of peroxides of the cyclohexanone was utilized. 72 g. of this solution, equal to 0.1 gram-atom of peroxidic oxygen, were brought into contact at 20° C. with 230 g. of 99% formic acid (5 mols), containing 2.5 g. of pure sulfuric acid. The mixture was stirred for 30 minutes and then the phases were separated by decantation. The cyclohexane phase weighed 63 g. and did not contain more than 2 g. of peroxides, which showed a conversion ratio amounting to about 82–83%. The formic phase, weighing 239 g., contained 5.3 g. of ε-caprolactone (0.046 mol) and 5.6 g. ε-formyloxycaproic acid (0.035 mol). The yield in derivatives of 6-hydroxy caproic acid amounted to about 96% based on the converted peroxides, after deducting the caprolactone present in the starting operation.

EXAMPLE 3

Example 2 was repeated, but the mixture was left to react for 2 hours instead of 30 minutes. The conversion ratio of the peroxides amounted to 97.5% and, consequently, the cyclohexane recovered was practically in a pure state: 61 g. at 98.8% containing only 0.5% by weight of peroxides, and some traces of cyclohexanone, caprolactone and formic acid. The formic phase contained 2.4 g. of ε-caprolactone (0.021 mol) and 11 g. of ε-formyloxycaproic acid (0.069 mol). The yield amounted to 92.5% of the theory based on the converted peroxides taking the caprolactone formerly present into account.

By comparison, an identical attempt carried out without sulfuric acid resulted in a conversion of the peroxides in less than 10%.

EXAMPLE 4

This example describes a continuous process using a solution having 16.9% by weight of peroxides in the cyclohexane. The nature and the proportion of the peroxides were the same as previously stated. Moreover, the solution contained 2.1% of cyclohexanone and 0.3% of caprolactone. The plant was constituted of three Pyrex glass reactors equipped with mixers and each was capable of holding 750 cc. of solution. These reactors were arranged in series. The solution of peroxides and the mixture of acids were introduced into the first reactor the contents of which flowed into the second one along a lateral pipe and so on from the second one into the third one.

The pipes were placed in such a way that the mixture stayed in the reactor for about 35 to 40 minutes in each of the first two reactors and 25 minutes in the third one. At the outlet of the last one, the mixture was separated in a decanter. The mixture was maintained at 36–37° C. in the first reactor and at 25–30° C. in the other two. The hourly yields were as follows: 86.1 g. of solution at 16.9% of peroxides, corresponding to 0.127 gram-atom of peroxidic oxygen, 245 g. of formic acid 99% (5.3 mol) and 2.15 g. of sulfuric acid. The cumulative ratios of conversion of the peroxides amounted to 77.5% in the first reactor, 93% in the second one, and 95–97% in the third one. In the decanter one recovered, hourly, 71.5 g. of cyclohexane at 98.6% containing 0.7% by weight of peroxides, and 261 g. of formic phase containing 2.9 g. of ε-caprolactone (0.025 mol) and 14 g. of ε-hydroxycaproic acid (0.087 mol). The yield amounted to 91% of the theory in relation to the converted peroxides taking the formerly present caprolactone into account.

The cyclohexane recovered in the decanter could be recycled as such for extracting additional peroxides as described in the Weiss application.

We claim:

1. A method for producing derivatives of 6-hydroxy caproic acid which comprises reacting at a temperature in the range between 0° and 40° C. a solution of concentrated formic acid and between about 0.25 to about 5 percent of a mineral acid or a strong organic acid based on the formic acid with at least one peroxide of cyclohexanone dissolved in an inert non-polar solvent immiscible with a solution of formic acid for a period sufficient for the transformation of the peroxide of cyclohexanone at the reaction temperature, and thereafter recovering ε-formyloxycaproic acid from the solution of formic acid.

2. A method according to claim 1 wherein the solution of formic acid contains less than 25% by weight of water.

3. A method according to claim 2 wherein the peroxide of cyclohexanone is a dimer of a trimer or a mixture of both.

4. A method according to claim 3 wherein the amount of the peroxide of cyclohexanone in the non-polar solvent is about 2% to 25% by weight of the solution.

5. A method according to claim 4 wherein at least 2 mols of formic acid per gram-atom of peroxidic oxygen is used to react with the peroxide of cyclohexanone.

6. A method according to claim 5 wherein concentrated formic acid containing less than 2% by weight of water is used in the preparation of the solution of formic acid containing a mineral or a strong organic acid.

7. A method according to claim 3 wherein the mineral acid is sulfuric, phosphoric, or hydrochloric acid.

8. A method according to claim 3 wherein the strong organic acid is methanesulfonic, ethanesulfonic, or p-toluenesulfonic acid.

9. A method according to claim 3 wherein the non-polar solvent is a saturated hydrocarbon containing 5 to 12 carbon atoms, an aromatic hydrocarbon containing 6 to 8 carbon atoms, or a halogenated lower alkane.

10. A method according to claim 7 wherein the non-polar solvent and the solution of formic acid are separated by decantation, and thereafter the products are recovered from the solution of the formic acid.

References Cited

UNITED STATES PATENTS

| | | | |
|---|---|---|---|
| 3,234,212 | 2/1966 | Winnick et al. | 260—535 |
| 3,428,656 | 2/1969 | Weiss | 260—488 |
| 3,492,339 | 1/1970 | Hawkins et al. | 260—488 |
| 2,904,584 | 9/1959 | Payne et al. | 260—535 |

FOREIGN PATENTS

| | | | |
|---|---|---|---|
| 1,395,969 | 3/1965 | France | 260—488 |

VIVIAN GARNER, Primary Examiner

U.S. Cl. X.R.

260—338, 343

UNITED STATES PATENT OFFICE
CERTIFICATE OF CORRECTION

Patent No. 3,784,567  Dated January 8, 1974

Inventor(s) Arsene Isard and Francis Weiss

It is certified that error appears in the above-identified patent and that said Letters Patent are hereby corrected as shown below:

Column 6, line 23, "of" (second occurrence) should be --or--

Signed and sealed this 23rd day of April 1974.

(SEAL)
Attest:

EDWARD M. FLETCHER, JR.
Attesting Officer

C. MARSHALL DANN
Commissioner of Patents